Dec. 25, 1951   J. L. WEBER   2,580,055
WIRE NAIL MACHINE
Filed April 9, 1946   2 SHEETS—SHEET 1
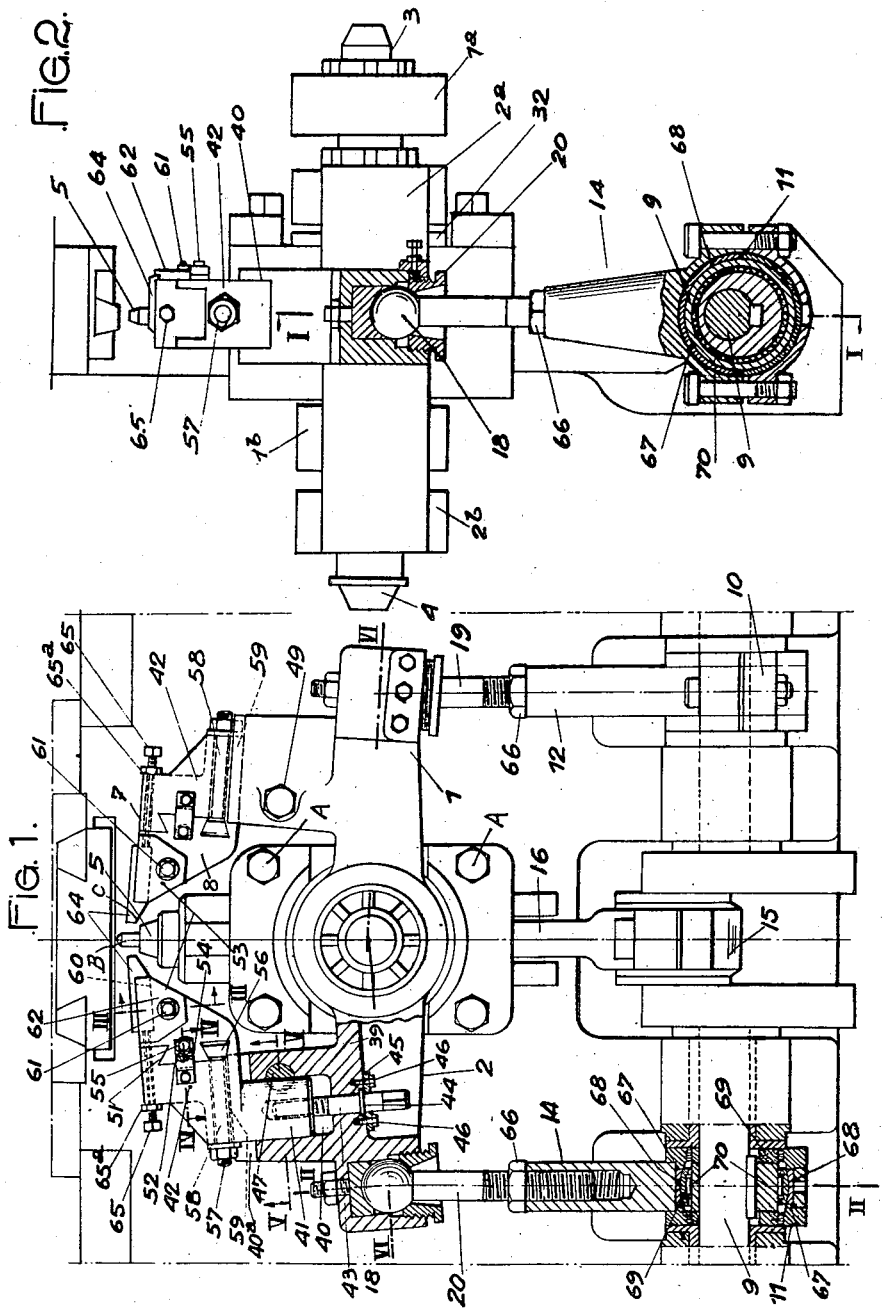
Inventor
JEAN LOUIS WEBER
By Haseltine, Lake & Co.
Attorneys Dec. 25, 1951  J. L. WEBER  2,580,055
WIRE NAIL MACHINE
Filed April 9, 1946  2 SHEETS—SHEET 2
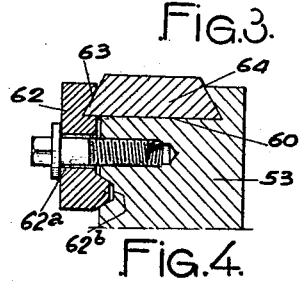
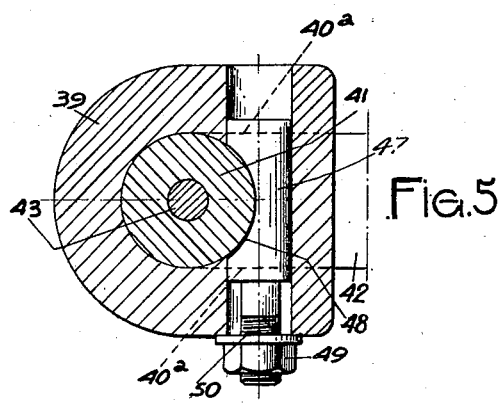
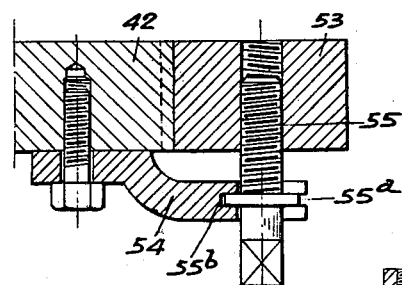
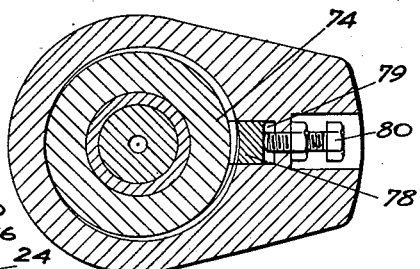
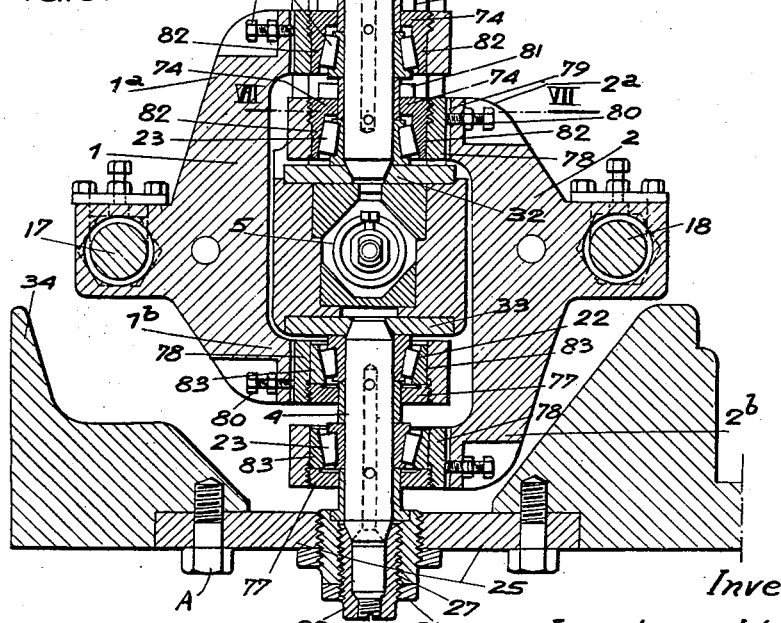
Inventor
JEAN LOUIS WEBER
By Haseltine, Lake & Co.
Attorneys

UNITED STATES PATENT OFFICE 2,580,055

WIRE NAIL MACHINE

Jean Louis Weber, Puteaux, France

Application April 9, 1946, Serial No. 660,689
In France February 10, 1943

2 Claims. (Cl. 10—49)

Machines provided for the manufacture of nails generally comprise, in addition to a wire straightening means, a feeder gripping device mounted on a step by step feeding carriage for the wire, clamping jaws for clamping said carriage first during formation of the head by pressure or impact, and then during the cutting operation and cutting off mechanism comprising cutters adapted to shear the nails while simultaneously forming the ends thereof, means being provided for finally expulsing the nails thus produced and for synchronously controlling the various members of such machines.

The improvements which form the objects of this invention, are generally applicable to automatic machines of the above-specified type but are more particularly concerned with the structure of the cutting device, the controls thereof and relative disposition thereof with respect to the feeder means and the head-forming means.

The cutting devices in present use, are provided in various types, the principal of which are indicated hereinafter.

A certain type of such devices comprises two levers pivoted intermediate their ends about a pair of spaced parallel axes between which travels the head-forming ram or hammer-head; two corresponding ends of said levers are provided with cutters while the two opposite ends are provided with rollers at all times engaging a groove cam. Under the action of this cam, the rotation of which is synchronised with the general movement of the various parts of the machine, said levers rotate together with their cutters which travel in an arcuate path so as to shear the wire and form the point of the nail.

In cutting devices of the above type, there occurs after a certain period of use, a certain amount of wear of the cam groove and of the rollers so that the cutters strike each other and effect mutual damage. Such machines require frequent adjustment and their speed is necessarily limited because of counter-camming effect.

In a cutter mechanism of more recent construction, it has been attempted to overcome the above-mentioned drawbacks. To that end, both levers are pivoted on a common axis and are controlled by a mechanism of the link-and-crank or eccentric type, the cutter-carrying ends being constituted by lateral extensions parallel with the common pivotal axis of the levers and wherebetween may travel, during the periods when said members are spaced apart, the head-forming ram. In a structure of such type, the cutter-carrying ends work in overhanging condition, whereby flexing and vibrational stresses are produced, thus limiting the speed of the machine. In order to reduce such vibrations, the levers have been especially constructed to offer sufficient mechanical rigidity, but the increase in weight resulting therefrom sets a fresh limit to the speed of such machines.

In another form of cutter-device, also of recent construction, the cutters are mounted on slides actuated in rectilineal reciprocating motion through the medium of crank-and-linkage or eccentric systems, which in turn are driven from the main shaft by lateral shafts through bevel pinion couplings.

Such a rectilineal reciprocating device lacks flexibility and the cutter-carriers soon take on wear and play which produces an incorrect positioning of the cutters relative to each other at the time shear is effected, and consequently imperfectly manufactured nails and rapid wear of the cutters result. Furthermore, the slideways for the slides or cutter-carriers are located in the immediate vicinity of the shearing area and the loops formed as the wire is cut off frequently engage such slideways and cause binding.

This invention relates to improvements in wire-nail machines for overcoming all the above-mentioned drawbacks and for providing a solution to the hereinabove defined technical problem, viz. that of obtaining a very high operational speed with a machine having reduced over-all dimensions and weight, wherein the different stresses are balanced, wear reduced to a minimum and maintenance practically non-existent.

The main object of the invention is to provide in a wire-nail machine of the type wherein the cutter mechanism comprises two hinged levers, the hinger pivotal member of each lever in the form of a fork whereof the arms are respectively pivoted about separate axes arranged in alignment with respect to each other, but providing between said axes and the arms of the fork suitable clearance space for travel of the ram which is adapted to form the heads of the nails or the like.

The forks of both levers may be offset with respect to each other or may comprise a plurality of staggered arms.

Another object of the invention is to provide a wire-nail machine of the character described wherein the levers are positively controlled by means of any appropriate mechanism capable of imparting to said levers oppositely reciprocating oscillation in synchronised time-relationship with the various mechanism of the machine, such as a mechanism of the general crank-and-link or eccentric type, the connection between each link and the associated lever being of the ball and socket type.

The centers of the ball and socket connections are arranged in a plane containing the longitudinal axis of the ram and perpendicular to the pivotal axis of the levers.

Another object of the invention is to provide a wire-nail machine of the character described wherein each of the cutters is mounted at the end of the corresponding oscillating lever arm in such a manner as to be adjustable in all three directions.

Another object of the invention is to provide a wire-nail machine of the character described wherein, in order to make possible adjustment of the length of stroke of the cutter-supporting oscillating levers, the links controlling such levers are adjustable in length and are each formed for example in two parts threadedly connected with each other or connected by a double adjusting sleeve threadedly engaging oppositely threaded ends on both said parts.

Another object of the invention is to provide a wire-nail machine of the character described wherein, in order to allow the controlling links of the oscillating levers bearing the cutters to work at all times in the best possible conditions without being subjected to distortion or causing distortion on the driving crank shaft or similar driving member, such links are supported on the corresponding bearings of said shaft by means of ball and socket connections of any suitable type, such as smooth, or comprising balls, rollers or needles.

A further object of the invention is to provide a wire-nail machine of the character described wherein the two oscillating cutter carrying levers are mounted on the respective pivotal axes thereof by means of conical roller bearings provided with means for taking up play.

The invention also comprises further particular features which will appear in the course of the following disclosure made in reference with the appending drawings given by way of example only and wherein:

Fig. 1 is a plan view partly in section on line I—I of Fig. 2 of a machine embodying the improvements according to the invention.

Fig. 2 is a side view of the machine partly in section on line II—II of Fig. 1.

Fig. 3 is a cross section on line III—III of Fig. 1.

Figs. 4, 5 and 6 are partial cross-sections at enlarged scales through lines IV—IV, V—V and VI—VI of Fig. 1 respectively.

Fig. 7 is a partial cross-section on enlarged scale through line VII—VII of Fig. 6.

In the embodiment herein illustrated solely by way of example, the cutter mechanism comprises two rotatable levers 1 and 2 made in the shape of forks and pivoted by the arms 1a, 1b and 2a, 2b of said forks about two axes or pivots 3 and 4 arranged in aligned relationship with respect to each other but providing therebetween clearance room for the passage of the mechanism of ram 5 provided for forming the heads of the nails. The upper arms 1a and 2a of the forks of levers 1 and 2 are pivoted on the upper axis 3, and the lower arms 1b and 2b of said forks are pivoted on the lower axis 4, as more particularly shown in Fig. 2. The forks of levers 1 and 2 are adapted to provide central clearance space for the passing of ram 5 as indicated above.

According to the invention and so as to permit adjustment of each of the cutters 64 as accurate as it is desired in three directions perpendicular each other, the direction of the longitudinal adjustment for the cutter 64 itself being substantially perpendicular to the axis of the wire utilized for the manufacture of nails or the like, the arm 39 of each of the oscillating levers 1 and 2 comprises a cylindrical recess 40 the axis of which is substantially parallel to the direction of the movement of the hammer-head forming the heads of the nail or the like. In said recess 40 there is mounted with a smooth friction fit a cylindrical rod 41 integral with a support 42. The end of the rod 41 is formed with an internally threaded hole into which extends the end of an adjusting screw 43 comprising a flange 44 axially held in position in a recess formed in the arm 39 of the oscillating lever by a strap member 45, secured to said arm by screw 46. It will be seen that by rotating the screw 43 in either direction, there will result an axial displacement of the rod 41 and of the support 42 integral therewith in one or the other direction. After adjustment the rod 41 is rigidly blocked in position on the arm 39 by any suitable means such for example as a transverse key member 47 (Fig. 5) formed with an arcuate recess 48 effective to wedge the rod 41 in its socket when the key is tightened by means of a nut 49 engaged on a threaded end portion of said key member 47 and bearing on the lateral face of the arm 39. In order to prevent a rotation of the support 42 by an angular movement of the cylindrical rod 41 in its socket 40, the base of the support 42 extends into a recess 40a having a width corresponding to that of the base of support 42 and formed in the end portion of the arm 39 (Figs. 1 and 5).

The support 42 comprises on its inner side face which is parallel to the axis of the rod 41, a groove 51 extending perpendicular to said axis and having a dove-tail cross section which is engaged by a correspondingly shaped feather portion 52 provided on a cutter carrier 53. On the support 42 is secured in any suitable way a lateral lug 54 (Fig. 6) positioned in registry with the ends of the groove 51 and the feather 52 of the cutter-carrier 53. A screw 55 having a flange 55a engages an inwardly threaded hole of the cutter carrier 53. The flange 55a fits into a recess 55b centrally provided in the end of the lug 54 so as to make possible lateral adjustment of the cutter carrier 53 on the support 52 in one direction by rotating in the appropriate direction the screw 55 which is axially fixed by its flange 55a perpendicular to the direction of the axis of the rod 41. Setting of the cutter carrier 53 in the desired position is obtained by means of a suitably shaped wedge member 56 bearing against the opposite face of the groove 51 and the feather 52, and blocked in adjusted position by means of a nut 57 screwed on a threaded rod 58 integral with the wedge 56 and extending through a suitable aperture 59 in the support in a direction perpendicular to the groove 51 and the axis of the rod 41.

The cutter-carrier 53 likewise comprises on its upper face a groove 60 (Fig. 2) extending perpendicular to the feather 52 and to the rod 51. On the lateral face of the cutter-carrier opposite to the groove 60 is secured by a screw 61 extending into a corresponding threaded aperture of the cutter carrier 53, a lateral plate 62 comprising a groove 63 which cooperates with the groove 60 to complete a dove-tail groove wherein is mounted the cutter 64 having a correspondingly formed cross-section (Fig. 3). The lateral plate 62 is guided by means of a lug 62a of trapezoidal cross-section engaging a correspondingly formed groove 62b in the cutter carrier 53.

Lengthwise adjustment of the cutter is accomplished by means of a screw 65 provided with a lock nut 65a and extending through a threaded aperture suitably positioned in the support 43, the end of said screw 65 bearing against the rear face of the cutter 64 opposite its cutting face. The cutter 64 may be set in adjusted position by clamping the lateral plate 62 with the screw 61.

It will be seen from the above description that perfect adjustment of each of the cutters 64 may be obtained inasmuch as adjustment of each of said cutters is accomplished in three directions in perpendicular relationship between each other as indicated above.

The oscillating levers 1 and 2 are actuated from a main shaft 9 adapted to form a crank-shaft or eccentric which also provides for the reciprocation of the ram 5. The crank-pins 10 and 11 respectively control, through the medium of links 12 and 14, levers 1 and 2 while an intermediate crank-pin 15 provides, through a link 16, for reciprocation of the ram 5 (Fig. 1). The respective crank-pins 10 and 11 are constituted in the embodiment being described, by eccentrics keyed on the main shaft 9.

According to the invention and in order to allow slight lateral oscillations of each of said links during operation of the machine, said links 12 and 14 are respectively mounted on crank-pins 10 and 11 keyed on the main driving shaft 9 of the machine through ball and socket bearings. Thus as diagrammatically shown by way of example in Fig. 1, the head portion of each of the links 12 and 14 comprises an outer ring 67 made in two parts having a spherical inner machined surface 68 fitting over a correspondingly formed outer surface machined on an inner ring 69 mounted on the corresponding crank pin of the shaft 9 either directly or by means of a needle, ball or roller bearing 70. The crank pin may be directly formed on the part 9 or adapted and keyed thereto as shown in Fig. 1.

According to the invention and as shown in Fig. 1 of the drawings the driving link of each one of the alternating levers is preferably made up of two parts, threadedly connected between each other so as to provide for adjustment of the length of that link a lock nut 66 being provided for maintaining both said parts of the link in adjusted position. It is quite clear that any other means for adjusting the length of said links could also be used. Thus each of the links could be made up of two parts having their adjacent ends formed with opposite screw threads. Such two parts could then be connected between each other in the well-known manner by a double sleeve having corresponding internal threads so that by rotating the sleeve in the proper direction the length of the link may be adjusted to the desired value.

Coupling of the levers 1 and 2 with the associated driving links 12 and 14 is provided through connections 17 and 18 of the ball and socket type provided with wear compensating means constituted by nuts 19 and 20. Such ball and socket connections could obviously be replaced by any other means capable of accomplishing the same function and in particular by gimbals, rack or other devices controlled by eccentrics.

The above described mechanism imparts to the levers 1 and 2 oscillating reciprocating motions in reverse directions and synchronized with respect to each other, the point of contact between the paths of travel of those movements at each reciprocation (said point of contact being the point in the operative cycle where cutting is effected) being situated in a plane containing the longitudinal axis of the main shaft 9, the centers of the ball and socket connections 17, 18 and the longitudinal axis of the ram 5, said plane being normal to the longitudinal axis of the pivots 3 and 4. Moreover, such point of contact is located in a plane normal to the longitudinal axis of the main shaft and containing the axis of pivots 3 and 4 as well as the longitudinal axis of the ram 5.

In the form of embodiment illustrated, levers 1 and 2 are supported on pivots 3 and 4 through the intermediary of conical roller bearings 22 and 23 but any other type of mounting could be used and particularly ball bearings, roller bearings, needle bearings or even solid or conical bushing bearings.

However, and in order to allow the taking up of wear or play which may occur during the operation of the machine at the location of hinging connections of the oscillating levers 1 and 2, there are preferably utilized for mounting the said levers on their respective pivots conical roller bearings 22 and 23 with means for taking-up the wear or play.

To that end the conical outer race 82 of each of the bearings 22 and 23 mounted on the pivot 3 for example has an extension in the form of a ring 74 having an outwardly screw-threaded surface engaging a complementary inwardly screw-threaded aperture formed in the arms 1a and 2a of the respective levers 1 and 2. Such threaded rings 74 are provided with castellated portions 81 or the like to facilitate their adjustment. The outer races 83 of the roller bearings 22 and 23 mounted in the arms 1b and 2b of levers 1 and 2 are held in place by threaded rings 77. Each of the threaded rings 74 and 77 is locked in position by any suitable means such as a key 78 as shown extending through a groove 79 formed in each of the arms of the levers 1 and 2 parallel to the oscillating axes thereof. Each of such keys 78 comprises at the end thereof opposite to the screw threaded ring 74 or 77 as the case may be, a complementary screw threaded portion engaging that of the ring and locking the same in position by means of a screw 80 mounted in the arm and bearing against the rear face of said key 78.

When it is desired to compensate for wear which may occur in the hinging connection of said members, it is merely necessary to unclamp the threaded rings 74 by unscrewing the set screws 80 of the keys 78, then the threaded rings 74 are screwed up so as to cause axial movement of the outer conical races of the various bearings 72 and 73 in the direction corresponding to the tightening of such bearings. After adjustment said rings 74 are retightened by means of a screw 80 acting on the locking keys 78 of said races.

The forks of both levers may be offset as shown but they could also comprise a plurality of arms arranged in staggered relationship.

The assembly comprising levers 1, 2 and pivots 3, 4 is centered and held in position by an upper bridge member 24 and a lower bridge member 25 secured to the frame of the machine. The center portion of the bridges is bored and threaded to receive nuts 26 and 27 for clamping the roller bearings, such nuts themselves being bored and threaded to receive members 28 and 29 for blocking the pivots 1 and 2. Such members are provided with lock nuts 30 and 31 and are bored and threaded at one end thereof for adapting a lubricator, the opposite end of each member being formed with a tapered bore for receiving the correspondingly formed tapered end of each pivot. The opposite end of each pivot is fitted into a tapered bore formed centrally of the centering flanges 32 and 33 which fit into corresponding recesses of the frame 34.

All the above described parts, after adjustment and clamping, form a homogeneous unit integral with the frame.

In order to remove the levers 1 and 2, it is merely necessary to unscrew the attaching bolts of the bridges 24, 25 such as A and to remove those bridges bodily with both locking members thereof without disturbing the adjustment of said members nor removing the same; it is then a simple matter to remove the pivots 3, 4 and the levers 1, 2 are thereby released.

It should be noted that wear on the system of pivots is negligible by reason of the small amount of travel of the levers; such wear is practically non-existent in connection with the ball and socket joints. Under such conditions, the amount of maintenance required for the machine is very small.

It will further be noted that, in the event where the cutters should accidentally remain in cutting position during the advance stroke of the ram in consequence of their failure or of unscrewing of bolts 61, the ram will act upon the corresponding associated ramp surfaces B and C of the levers 1 and 2 to move said levers out of the way before reaching the cutters.

The machine is completed by all the usual devices comprising wire straightening means, wire feeding means and means for clamping the wire in the head-forming and shearing positions, said means being immaterial in the present invention.

It will be understood that the form of embodiment described and shown is given by way of indication and not of limitation. Generally speaking, all modifications or variations which do not alter the main features as disclosed above nor the object pursued by the invention remain comprised within the scope thereof.

What I claim as my invention and desire to secure by Letters Patent is:

1. In a cutting device for nail machine of the type comprising cutters adjustably mounted on levers to provide a space for the reciprocating movements of a horizontal heading ram, the combination of a frame, two pivot pins mounted on said frame and respectively aligned with each other and spaced above and below the horizontal heading ram, two levers respectively located on each side of said ram and being pivoted on said pivot pins, each of said levers being formed with one cylindrical recess opening laterally spaced from said pivot pins and the axis of which is substantially parallel to the horizontal axis of said ram, supports slidably mounted in said recesses and respectively formed with a vertical groove contained in a vertical plane substantially parallel to said horizontal axis, cutter carriers slidably mounted in said vertical grooves and respectively formed with a horizontal groove substantially perpendicular to said horizontal axis, cutters respectively slidably mounted in said horizontal grooves, means for adjusting the position of each cutter in the corresponding horizontal groove, means for adjusting the position of the cutter carrier in the corresponding vertical groove, and means for adjusting the position of the slidable support in the corresponding cylindrical recess, whereby each adjusting means operates independently from the others, and individual means for locking said cutter, cutter carrier and support, respectively, after adjustment.

2. In a cutting device for a nail machine of the type comprising a pair of cutters, each being adjustably mounted on a respective one of a pair of levers to provide a space for the reciprocating movements of a horizontal heading ram, said machine having a crankshaft and connecting rods for imparting to said ram and levers oscillating movements in synchronized time relationship, the combination of a frame, two pivot pins mounted on said frame and respectively aligned with each other and spaced above and below the horizontal heading ram, said pair of levers being respectively located on each side of said ram and pivoted on said pivot pins, said connecting rods for connecting respective ones of the crank pins of the crankshaft to respective ones of said levers being rotatable for length adjustment so that the opening angle of said levers may be increased whereby the same nail machine may produce nails in a greater range of wire diameters, the levers being provided with spherical recesses, the line of centers of which are substantially aligned with the pivotal axis of said levers and located in the horizontal plane containing the horizontal axis of said ram and perpendicular to said horizontal axis, and the connecting rods for controlling said levers being each formed with one terminal spherical housing, a ball and socket device adjustably secured on one end of each of said connecting rods, the ball element of which swivels in a respective one of said spherical recesses, and a spherical bearing housed in each said spherical housing and surrounding the corresponding crank pin of the crankshaft, whereby the stresses generated by misalignments are not transmitted to the pivot pins, and means for adjusting said ball members with respect to said connecting rods and said levers whereby the play generated by wear can be taken up.

JEAN LOUIS WEBER.

REFERENCES CITED

The following references are of record in the file of this patent:

UNITED STATES PATENTS

| Number | Name | Date |
|---|---|---|
| 359,564 | Happe | Mar. 15, 1887 |
| 415,480 | Taylor | Nov. 19, 1889 |
| 423,254 | Horton | Mar. 11, 1890 |
| 648,383 | Blakeslee | May 1, 1900 |
| 679,128 | Smith | July 23, 1901 |
| 780,873 | Donaghy | Jan. 24, 1905 |
| 1,492,793 | Hansen | May 6, 1924 |